United States Patent [19]

Chow

[11] 3,729,586

[45] Apr. 24, 1973

[54] DIGITAL GUARD-TIME CIRCUIT FOR USE IN A FRAME SYNCHRONIZATION CIRCUIT

[75] Inventor: Quon Sang Chow, Ottawa, Ontario, Canada

[73] Assignee: Northern Electric Company Limited, Montreal, Quebec, Canada

[22] Filed: Sept. 23, 1971

[21] Appl. No.: 183,110

[52] U.S. Cl. ..............................................178/69.5 R

[51] Int. Cl. ..................................................H04l 7/00

[58] Field of Search......................178/69.5 R, 69.5 F; 179/15 BS

[56] References Cited

UNITED STATES PATENTS 3,144,515 8/1964 Kaneko...........................179/15 BS

*Primary Examiner*—Robert L. Griffin
*Assistant Examiner*—George G. Stellar
*Attorney*—John E. Mowle

[57] ABSTRACT

A digital counter is responsive to framing error pulses for providing a signal after a predetermined number of error pulses have been counted within a predetermined interval of time. Access to the counter by the error pulses is controlled by a first retriggerable monostable multivibrator which has a time constant greater than the time duraction of one frame and less than the time duration of N frames, where N is determined by the forward guard-time and the tolerable mis-frame rate of the system. The signal from the counter is used to trigger on a second retriggerable monostable multivibrator which determines the backward guard-time of the circuit and controls the sending of reframing pulses to a reframing circuit.

4 Claims, 1 Drawing Figure

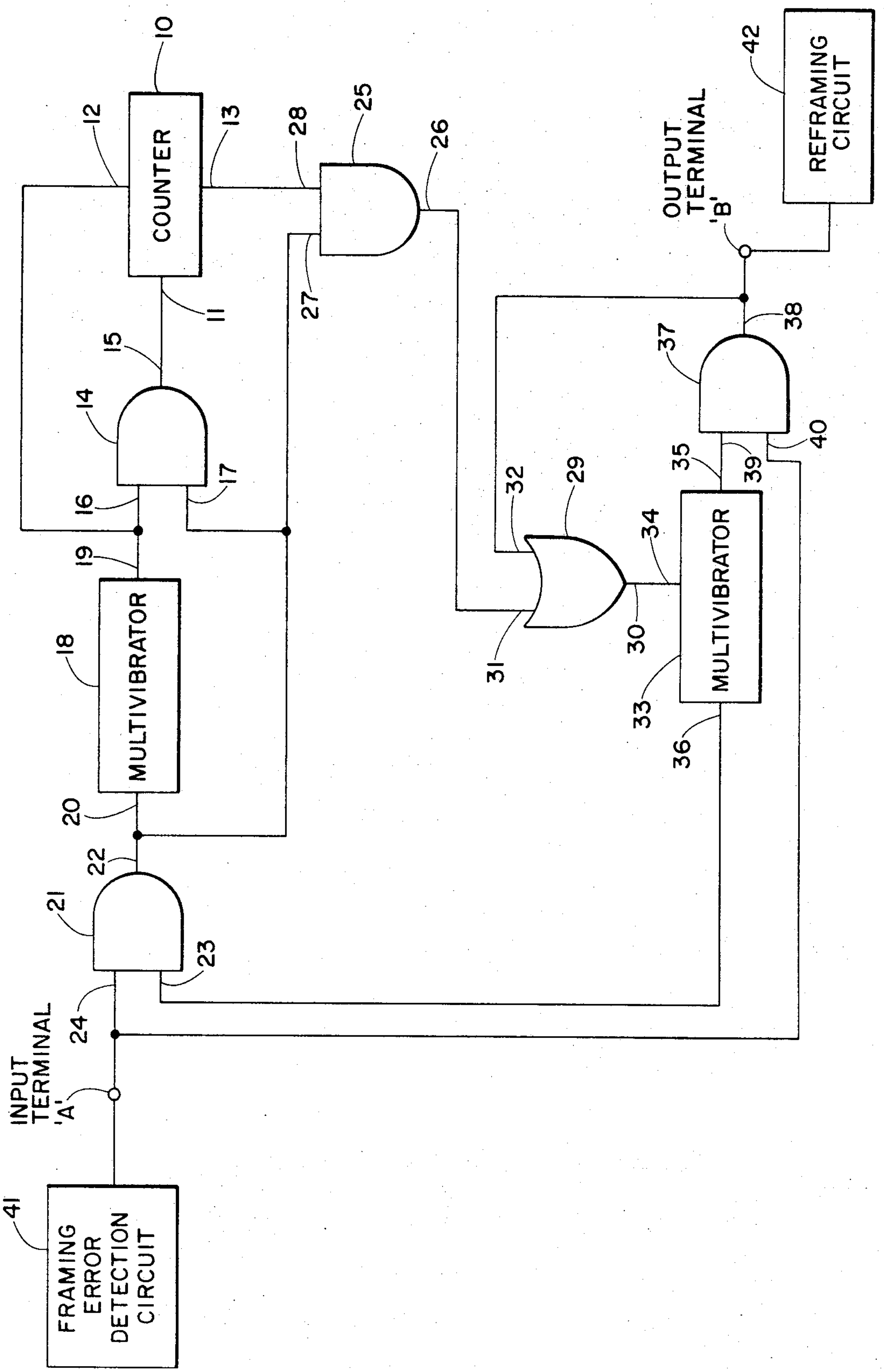
COUNTER
MULTIVIBRATOR
MULTIVIBRATOR
REFRAMING CIRCUIT
OUTPUT TERMINAL 'B'
INPUT TERMINAL 'A'
FRAMING ERROR DETECTION CIRCUIT
10
11
12
13
14
15
16
17
18
19
20
21
22
23
24
25
26
27
28
29
30
31
32
33
34
35
36
37
38
39
40
41
42

DIGITAL GUARD-TIME CIRCUIT FOR USE IN A FRAME SYNCHRONIZATION CIRCUIT

This invention relates to a frame synchronization circuit for a digital transmission system and more particularly to a guard-time circuit for such a frame synchronization circuit.

In a digital communication system such as a pulse code modulation system, the digital signals being transmitted are serially encoded in blocks each with a fixed number of digits. Each block of data constitutes a frame. The beginning of each frame is identified by inserting synchronizing pulses called framing digits. At the receiving end of the communication system, synchronization is established by identifying the frame digits. If for some reason synchronization is lost, the digital data stream must be brought back in synchronization or reframed as quickly as possible. The receiving terminal is therefore provided with a framing error detection circuit which detects a lack of synchronization in the incoming data and provides framing error pulses to a reframing circuit which serves to resynchronize the system usually by shifting the receiving terminal timing.

In designing a frame synchronization circuit, two parameters are of utmost importance, namely the forward guard-time and the backward guard-time. In order to ensure that the data stream is actually out of frame before reframe pulses are sent out, a certain number of error pulses must be accumulated in a given time interval. This time interval between the occurrence of the first framing error pulse and the sending out of the first reframe pulse is called the forward guard-time. After a certain number of reframe pulses are sent, the data stream is shifted back in frame again, and the framing error detection circuit will stop sending out error pulses. In order to ensure that the data stream has been actually brought back in frame, a predetermined number of consecutive error free framing digits must be detected before the data stream is considered to be in frame. The interval of time between the last framing error pulse and the time at which the system is considered to be in frame again is the backward guard-time. The timing of the forward guard-time and backward guard-time required by the framing synchronization circuit may be provided by what is called a guard-time circuit.

The guard-time circuits presently in use are usually of the analog type. The error pulses provided by a framing error detection circuit are integrated by an RC network or a leaky active integrator. The presence of an error pulse charges the capacitor and the absence of an error pulse allows the accumulated charge on the capacitor to discharge a small amount. After a predetermined number of error pulses have been integrated in a given interval--corresponding to the forward guard-time--, a threshold voltage is reached, after which reframe pulses are sent out to bring the data stream back in frame. Once synchronization is achieved, no more error pulses arrive and the integrator is allowed to discharge completely in a predetermined time interval, hence the backward guard-time.

However, the analog version of a guard-time circuit suffers from major disadvantages. For example, such a circuit is very sensitive to pulse shape and pulse width. Therefore, a pulse shaping network is usually required, before the integrator stage of the guard-time circuit, to ensure pulses with uniform energy. Also, since an integrator is an analog device, changes in temperature and component tolerances cause variations in the integrator time constant. These variations affect the threshold level and thus the accuracy of the device.

I have found that the disadvantages suffered by the analog type of guard-time circuit may be greatly alleviated by a digital type of guard-time circuit having similar operating characteristics.

In accordance with my invention, I provide a digital counter means responsive to framing error pulses provided by a framing error detection circuit. The counter provides a signal when a predetermined number of error pulses have been counted within a predetermined interval of time. A first means is responsive to the framing error pulses for enabling the counter means to receive the framing error pulses and for resetting it when the predetermined number of framing error pulses have been counted within a predetermined interval of time or when the number of error pulses does not reach the predetermined number within the same predetermined interval of time. A second means is responsive to the signal from the counter for providing reframe pulses to a reframing circuit. Each of the reframe pulses corresponds to a framing error pulse received subsequently to the signal from the counter.

An example embodiment of a guard-time circuit in accordance with my invention is illustrated in the drawing which is a block circuit diagram of a frame synchronization circuit.

A counter 10 has a first input terminal 11 connected to an output terminal 15 of an AND gate 14 and a second input terminal 12 connected to an output terminal 19 of a multivibrator 18 which is also connected to an input terminal 16 of gate 14. An input terminal 20 of multivibrator 18 is connected to an output terminal 22 of an AND gate 21 which is also connected to an input terminal 17 of gate 14 and to an input terminal 27 of an AND gate 25. An input terminal 28 of gate 25 is connected to an output terminal 13 of the counter 10, and an output terminal 26 of gate 25 is connected to a first input terminal 31 of an OR gate 29. An output terminal 30 of gate 29 is connected to an input terminal 34 of a multivibrator 33. A first output terminal 35 of multivibrator 33 is connected to a first input terminal 39 of an AND gate 37 whose output terminal 38 is connected to an output terminal B and to a second input terminal 32 of gate 29.

A second output terminal 36 of multivibrator 33 is connected to an input terminal 23 of gate 21. An input terminal A is connected to an input terminal 24 of gate 21 and an input terminal 40 of gate 37.

The counter 10 may be any type of digital circuit, such as a binary counter, responsive to a predetermined number of input pulses to provide an output signal. The time duration of the predetermined number of pulses corresponds to the forward guard-time of the circuit.

The multivibrator 18 is a retriggerable monostable having a time constant greater than the time duration of one frame and less than the time duration of N frames, where N is determined by the forward guard-time and the tolerable mis-frame rate of the system. The tolerable mis-frame rate of the system is defined as the rate of errors in the framing digits themselves while the system itself is in frame.

The multivibrator 33 is also a retriggerable monostable and it has a time constant equal to the time duration of a plurality of frames. This time constant corresponds to the backward guard-time of the circuit. By the time constant of a monostable is meant the duration of time that it is in its quasi-stable state after being triggered on.

As mentioned above, a guard-time circuit such as shown in the circuit diagram is a portion of a frame synchronization circuit which may include a framing error detection circuit 41 and a reframing circuit 42. Framing error pulses are received from the framing error detection circuit 41 at input terminal A of the guard-time circuit and reframing pulses are provided to the reframing circuit 42 via output terminal B.

In order to describe the operation of the guard-time circuit shown in the drawing, let us first assume that no framing error pulses are received at input terminal A. Under this condition, multivibrator 18 is in its quiescent condition. Its output terminal 19 is low (ground) thereby inhibiting gate 14 and resetting counter 10 through its connection to input terminal 12 thereof. Similarly, multivibrator 33 is in its quiescent condition. Its output terminal 35 is low inhibiting gate 37, and its output terminal 36 is high, enabling gate 21.

Let us now assume that the communication system is out of synchronization and that framing error pulses are received at input terminal A. On the first error pulse, the multivibrator 18 is triggered on, removing the reset condition from input terminal 12 of the counter 10, and enabling gate 14 which pulses the counter 10 thereby incrementing it.

If a second framing error pulse is not received at input terminal A within the time constant of multivibrator 18, it recovers its quiescent state thereby resetting the counter 10.

However, if more consecutive error pulses are received within the time constant of multivibrator 18, the counter 10 is incremented until it provides an output signal. This signal triggers on multivibrator 33 through gates 25 and 29. The output terminal 36 of multivibrator 33 goes low thereby inhibiting gate 21. Multivibrator 18 is allowed to recover its quiescent state and reset the counter 10. The output terminal 35 of multivibrator 33 goes high and enables gate 37. Subsequent framing error pulses pass through gate 37 and appear on output terminal B and at the reframing circuit 42 as reframing pulses. Each of these pulses is fed back through OR gate 29 to retrigger multivibrator 33. If a framing error pulse is received at anytime during the duration of time corresponding to the time constant of multivibrator 33, it will be retriggered.

However, when no framing error pulse has been received for a duratio.. of time corresponding to the time constant of multivibrator 33, it recovers its quiescent state. Its output terminal 35 goes low, inhibiting gate 37, and its output terminal 36 goes high enabling gate 21 thereby readying the circuit to repeat its timing function.

What is claimed is:

1. In a frame synchronization circuit for a digital transmission system, wherein each frame has the same predetermined time duration, said frame synchronization circuit having a framing error detection circuit for providing framing error pulses and a reframing circuit for resynchronizing the system, a guard-time circuit comprising:

a digital counter means responsive to said framing error pulses for providing a signal when a predetermined number of error pulses have been counted within a predetermined interval of time, a first means responsive to said framing error pulses for enabling said counter means to receive said framing error pulses and for resetting said counter means when said predetermined number of consecutive error pulses have been counted within said predetermined interval of time and when the number of error pulses does not reach said predetermined number within said predetermined interval of time, and a second means responsive to said signal for providing reframe pulses to the reframing circuit, each of said reframe pulses corresponding to each subsequent framing error pulse.

2. A guard-time circuit as defined in claim 1, wherein said first means comprises:

a first retriggerable monostable multivibrator having a time constant longer than the time duration of one of said frames and shorter than the time duration of N frames, where N is determined by the forward guard-time and the tolerable mis-frame rate of the system, a first gate means responsive to said framing error pulses and a first output of said first multivibrator for pulsing said counter means.

3. A guard-time circuit as defined in claim 2 wherein said second means comprises:

a second retriggerable monostable multivibrator having a time constant equal to the time duration of a plurality of said frames, a second gate means responsive to a first output of said second monostable and to said error pulses for providing said reframing pulses, an orring gate means responsive to said signal and to the reframe pulses for triggering said second monostable, and a third gate means responsive to a second output of said second monostable and to said framing error pulses for triggering said first monostable and for preventing access of said framing error pulses to said first monostable after the occurrence of said signal.

4. A guard-time circuit as defined in claim 3, wherein said counter means is a binary counter.

* * * * *